(12) United States Patent
Snellgrove et al.

(10) Patent No.: US 11,164,291 B2
(45) Date of Patent: Nov. 2, 2021

(54) UNDER WATER IMAGE COLOR CORRECTION

(71) Applicant: International Business Machines Corporation, Armonk, NY (US)

(72) Inventors: Thomas Snellgrove, Wakefield, MA (US); Rajeev Puri, Huntersville, NC (US); Tomas Krojzl, Brno (CZ); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 16/741,994

(22) Filed: Jan. 14, 2020

(65) Prior Publication Data

US 2021/0217144 A1  Jul. 15, 2021

(51) Int. Cl.
  *G06T 5/00* (2006.01)
  *G06T 7/50* (2017.01)
  *G06T 7/90* (2017.01)

(52) U.S. Cl.
  CPC .............. *G06T 5/005* (2013.01); *G06T 7/50* (2017.01); *G06T 7/90* (2017.01); *G06T 2207/10024* (2013.01); *G06T 2207/20081* (2013.01)

(58) Field of Classification Search
  CPC .. G06T 5/005; G06T 7/90; G06T 7/50; G06T 2207/10024; G06T 2207/20081
  USPC ........................................................ 382/106
  See application file for complete search history.

(56) References Cited

U.S. PATENT DOCUMENTS

| 3,571,649 A | 3/1971 | Bush, Jr. |
| 5,438,363 A | 8/1995 | Ejima |
| 5,512,941 A * | 4/1996 | Takahashi .............. G11B 27/36 348/81 |
| 9,087,385 B2 | 7/2015 | Fredlund |
| 9,354,809 B2 * | 5/2016 | Asahara .............. G06F 3/04845 |

(Continued)

FOREIGN PATENT DOCUMENTS

| CN | 103577185 A | 2/2014 |
| WO | 2012065037 A1 | 5/2012 |
| WO | 2019198611 A1 | 10/2019 |

OTHER PUBLICATIONS

"All You Need to Know About e-Commerce Returns in Europe", LogisticsMatter, © 2015, 13 pps., <http://www.logisticsmatter.com/2018/01/25/need-know-e-commerce-returns-europe/>.

(Continued)

*Primary Examiner* — Ali Bayat
(74) *Attorney, Agent, or Firm* — Brian Restauro, Esq.; Kevin P. Radigan, Esq.; Heslin Rothenberg Farley & Mesiti P.C.

(57) ABSTRACT

Aspects of the present invention disclose a method for color reconstruction of individual detected objects of an underwater image using a library of reference images. The method includes one or more processors obtaining image data of a computing device that includes an underwater image. The method further includes determining a depth measurement corresponding to the underwater image. The method further includes identifying an object of the underwater image based at least in part on a shape of the object. The method further includes reconstructing one or more colors of the object of the underwater image based at least in part on a reference image.

17 Claims, 5 Drawing Sheets

(56) References Cited

U.S. PATENT DOCUMENTS

| | | | |
|---|---|---|---|
| 9,736,338 B2 | 8/2017 | Schutte | |
| 9,753,140 B2* | 9/2017 | Cottrell | H04N 9/64 |
| 2002/0141639 A1 | 10/2002 | Steinberg | |
| 2012/0075458 A1* | 3/2012 | Kino | H04N 7/183 |
| | | | 348/81 |
| 2013/0019209 A1* | 1/2013 | Ishikawa | G06F 9/451 |
| | | | 715/838 |
| 2013/0321611 A1* | 12/2013 | Watanabe | H04N 7/183 |
| | | | 348/81 |
| 2015/0029356 A1* | 1/2015 | Noda | H04N 9/735 |
| | | | 348/223.1 |
| 2017/0328982 A1* | 11/2017 | Jongsma | G01S 5/16 |

OTHER PUBLICATIONS

"HunterLab Presents—The Basics Of Color Perception and Measurement", Version 1.4, © 2001 HunterLab, 125 pps., ELSCOLAB, <http://www.elscolab.nl/pdf/color.pdf>.

Iqbal et al., "Underwater Image Enhancement Using an Integrated Colour Model", IAENG International Journal of Computer Science, 34:2, IJCS_34_2_12, Advance online publication: Nov. 17, 2007, 6 pps., <https://pdfs.semanticscholar.org/f5f8/77290a40b2bf7517405b404d348f56d7f58f.pdf>.

Li et al., "An Underwater Image Enhancement Benchmark Dataset and Beyond", IEEE Transactions on Image Processing 2019, Jan. 11, 2019, 14 pps.

Marcos et al., "Classification of coral reef images from underwater video using neural networks", © 2005 Optical Society of America, Received Jul. 20, 2005; revised Oct. 15, 2005; accepted Oct. 15, 2005 Oct. 31, 2005 / Vol. 13, No. 22 / Optics Express 8766, 6 pps., <https://www.osapublishing.org/DirectPDFAccess/0537B676-D77C-05E0-0A5AB432B5A2FE22_86043/oe-13-22-8766.pdf?da=1&id=86043&seq=0&mobile=no>.

Reagan, "A $260 billion 'ticking time bomb': The costly business of retail returns", Published Dec. 16, 2016, CNBC, 4 pps., <https://www.cnbc.com/2016/12/16/a-260-billion-ticking-time-bomb-the-costly-business-of-retail-returns.html>.

Xie et al., "An Underwater Image Enhancement Algorithm for Environment Recognition and Robot Navigation", Received: Nov. 18, 2017; Accepted: Mar. 6, 2018; Published: Mar. 13, 2018, MDPI, Robotics 2018, 7, 14; doi:10.3390/robotics7010014, 13 pps., <https://www.researchgate.net/publication/324152537_An_Underwater_Image_Enhancement_Algorithm_for_Environment_Recognition_and_Robot_Navigation>.

* cited by examiner

UNDER WATER IMAGE COLOR CORRECTION

BACKGROUND OF THE INVENTION

The present invention relates generally to the field of image recognition, and more particularly to underwater color correction.

Computer vision is a field of computer science that works on enabling computers to see, identify and process images in the same way that human vision does, and then provide appropriate output. Computer vision tasks include methods for acquiring, processing, analyzing and understanding digital images, and extraction of high-dimensional data from the real world in order to produce numerical or symbolic information.

Visual recognition uses deep learning algorithms to analyze images for scenes, objects, and other content. Visual recognition deals with how computers can be made to gain high-level understanding from digital images or videos. Also, visual recognition is concerned with the automatic extraction, analysis and understanding of useful information from a single image or a sequence of images.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for color reconstruction of individual detected objects of an underwater image using a library of reference images. The method includes one or more processors obtaining image data of a computing device that includes an underwater image. The method further includes one or more processors determining a depth measurement corresponding to the underwater image. The method further includes one or more processors identifying an object of the underwater image based at least in part on a shape of the object. The method further includes one or more processors reconstructing one or more colors of the object of the underwater image based at least in part on a reference image.

DETAILED DESCRIPTION

Embodiments of the present invention allow for color reconstruction of individual detected objects of an underwater image using a library of reference images. Embodiments of the present invention utilize image recognition techniques to identify shapes of an underwater image. Embodiments of the present invention identify a color of an identified shape of an underwater image from a library of reference images utilizing a depth measurement corresponding to the underwater image. Additional embodiments of the present invention reconstruct a color of one or more identified shapes of an image of the underwater image independent of each of the one or more identified shapes.

Some embodiments of the present invention recognize that images taken underwater without the use of expensive underwater lighting equipment have muted colors due to light absorption of the water (i.e., the color in water is absorbed based on depth and color frequency). Consequently, the colors of underwater photos are blue-green compared to photos made with full color spectrum. Furthermore, embodiments of the present invention recognize that current methodologies that utilize depth information of underwater images to boost the colors using frequency histogram are ineffective if color is absent (i.e., this approach is not able to recover the original colors). Various embodiments of the present invention resolve these problems utilizing image recognition and a high-quality reference library of well-lit underwater subjects to reconstruct colors of an underwater image that includes muted and/or absent colors due to spectrum absorption.

Embodiments of the present invention can operate to eliminate the need to stock and/or attach color filters to an underwater camera to offset the color spectrum absorption of water. Various embodiments of the present invention eliminate the need for multiple color filters by dynamically adjusting parameters utilized to reconstruct colors of a photo based on an underwater depth of a camera taking the photo. Embodiments of the present invention can operate to a white balancing steps in a photo capture workflow, which also can be ineffective when color is absent due to spectrum absorption. Additionally, embodiments of the present invention improve the photo capture workflow by allowing a user to digitally correct image during or after capturing images by automatically identifying and reconstructing colors of shapes in a photo that includes muted and/or is absent of color due to spectrum absorption.

Implementation of embodiments of the invention may take a variety of forms, and exemplary implementation details are discussed subsequently with reference to the Figures.

Figure 1:
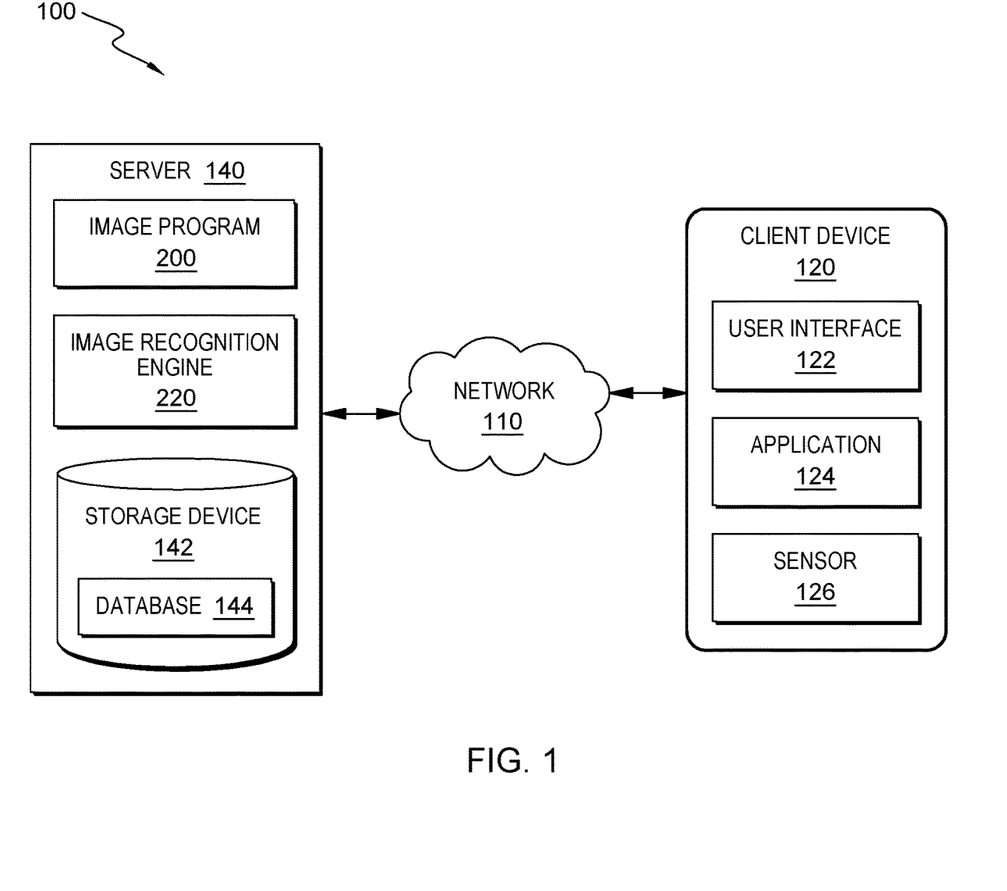
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Image program 200 enables the authorized and secure processing of personal data. Image program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Image program 200 provides information regarding personal data and the nature (e.g., type, scope, purpose, duration, etc.) of the processing. Image program 200 provides the user with copies of stored personal data. Image program 200 allows the correction or completion of incorrect or incomplete personal data. Image program 200 allows the immediate deletion of personal data.

Distributed data processing environment 100 includes server 140 and client device 120, all interconnected over network 102. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, client device 120, and other computing devices (not shown) within distributed data processing environment 100.

Client device 120 can be one or more of a laptop computer, a tablet computer, a smart phone, smart watch, a smart speaker, digital camera, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 4, in accordance with embodiments of the present invention.

Client device 120 may include one or more a processor, user interface 122, application 124, and sensor 126. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program.

Sensor 126 is a device, module, machine, or subsystem that is utilized to detect events or changes in an environment and send the information to other electronics. In various embodiments of the present invention sensor 126 may represent one or more sensors of client device 120. In one embodiment, sensor 126 is an image sensor that detects and conveys information used to make an image. In another embodiment, sensor 126 is depth/pressure sensor that detects and conveys information used to measure water depth.

For example, a user is using a waterproof digital camera (e.g., client device 120) to capture pictures of fish that live in a coral reef. In this example, the waterproof camera includes a barometer (e.g., sensor 126) to provide a user with an altitude or depth reading when capturing images. Additionally, the waterproof digital camera includes a client-side application (e.g., application 124) of image program 200 that can be utilized to perform functions/tasks of image program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, image recognition engine 220, and image program 200. Storage device 142 can be implemented with any type of storage device, for example, persistent storage 405, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as database 144. Database 144 may represent one or more organized collections of data stored and accessed from server 140. For example, database 144 includes reference images, depth measurements, color absorption information of water, and color temperatures. In one embodiment, data processing environment 100 can include additional servers (not shown) that host additional information that accessible via network 110.

Generally, image program 200 utilizes image recognition techniques to identify shapes of an underwater image and reconstruct colors of the identified shapes of the underwater image. In one embodiment, image program 200 retrieves image data from client device 120. For example, image program 200 retrieves an image from client device 120 and metadata (e.g., depth measurement) of the image from sensor 126 (e.g., pressure/depth sensor). In this example, image program 200 utilizes object detection techniques (e.g., machine learning approaches, deep learning approaches, etc.) to detect one or more shapes (e.g., objects) of the image.

In another embodiment, image program 200 utilizes image recognition engine 220 and database 144 to identify detected shapes of an image of client device 120. Generally, image recognition engine 220 is a machine learning algorithm that image program 200 utilizes to identify features, animals, objects or other targeted subjects. For example, image program 200 utilizes image recognition engine 220 to identify a shape of an image of database 144 (e.g., library of reference images) that matches a detected shape of an image of client device 120. Additionally, image program 200 can utilize features of the detected shape to identify the shape of the image of database 144 that matches the detected shape of the image of client device 120.

In yet another embodiment, image program 200 utilizes image recognition engine 220 and database 144 to determine a color of a detected shape of an image of client device 120. For example, image program 200 utilizes a color of a shape image recognition engine identifies in database 144 (e.g., library of reference images) to reconstruct a color of a detected shape of an image of client device 120. In this example, image program 200 utilizes a depth measurement, color absorption information, and color temperature corresponding to the detected shape of the image of client device 120 to generate a color of the detected shape.

Figure 2:
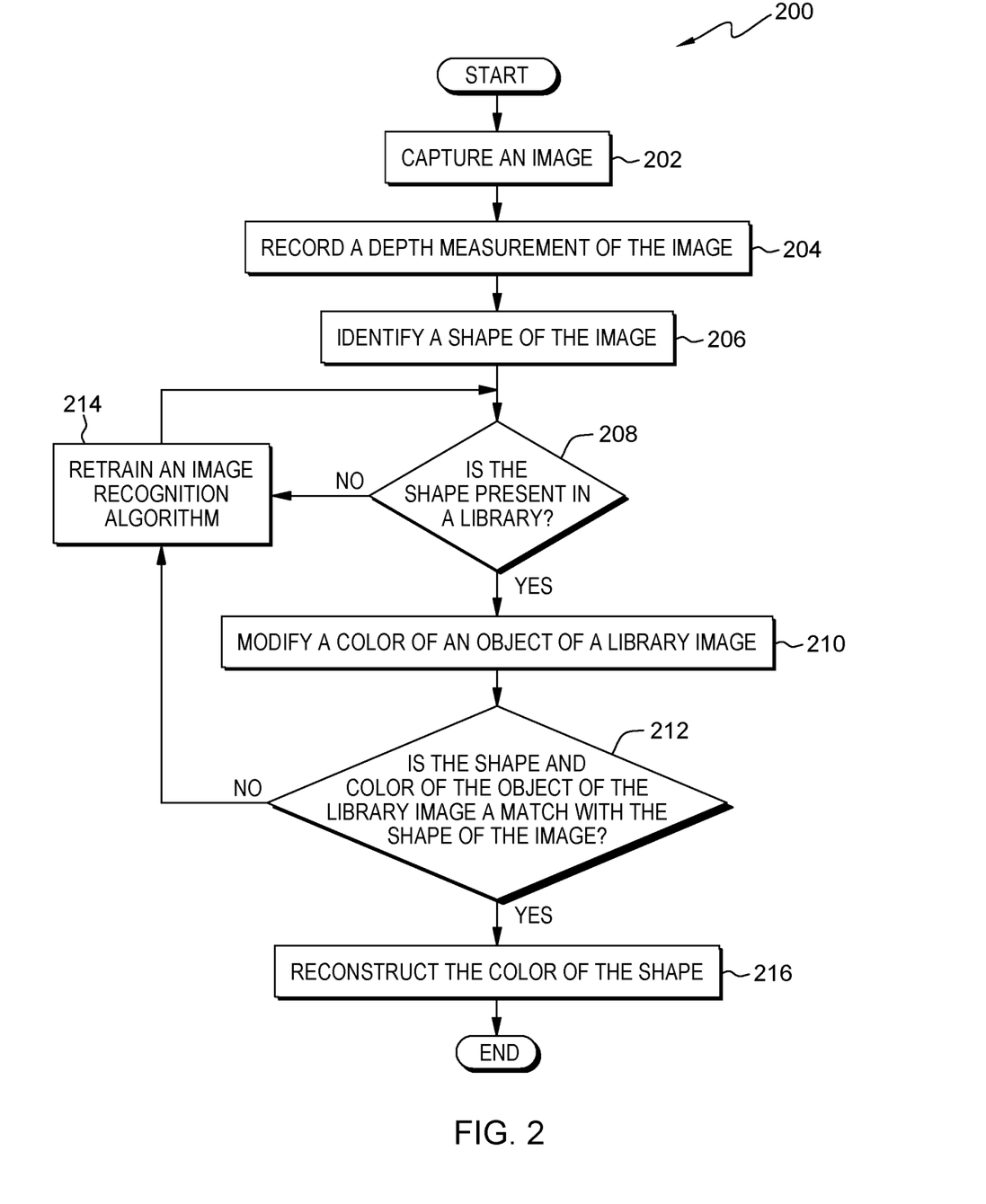
FIG. 2 is a flowchart depicting operational steps of a program, within the data processing environment of FIG. 1, for color reconstruction of individual detected objects of an underwater image using a library of reference images, in accordance with embodiments of the present invention.

FIG. 2 is a flowchart depicting operational steps of image program 200, a program for color reconstruction of individual detected objects of an underwater image using a library of reference images, in accordance with embodiments of the present invention. In one embodiment, image program 200 initiates in response to client device 120 capturing an image. For example, image program 200 initiates when a digital camera (e.g., client device 120) captures a photo. In another embodiment, image program 200 is continuously monitoring client device 120. For example, image program 200 monitors a digital camera (e.g., client device 120) of a user after the user registers the digital camera with image program 200.

In step 202, image program 200 captures an image. In one embodiment, image program 200 retrieves an image of client device 120. For example, image program 200 retrieves an image stored in memory (e.g., computer readable storage, persistent storage, etc.) of a digital camera (e.g., client device 120) and stores the image in a memory (e.g., storage device 142 of server 140). In another example, image program 200 monitors a digital camera (e.g. client device 120) to retrieve image data, which may include one or more images, in the field of view of the digital camera (i.e., capturing real-time or near real-time image sensor data of the digital camera).

In step 204, image program 200 records a depth measurement of the image. In one embodiment, image program 200 retrieves data of sensor 126 of client device 120. For example, image program 200 retrieves measurement data from a pressure sensor (e.g., sensor 126) that indicates a depth in meters that a digital camera (e.g., client device 120) is below a surface of a body of water. In another embodiment, image program 200 extracts depth information from an image of client device 120. For example, image program 200 retrieves an image file of a digital camera (e.g., client device 120) and utilizes natural language processing (NLP) techniques (e.g., parsing, word segmentation, lexical semantics, metadata analysis, etc.) to identify a recording corresponding to a depth measurement of the digital camera at the creation of the image file (i.e., at the time an image was taken).

Embodiments of the present invention recognize that generally, underwater photography presents unique challenges due to the properties of water and its effect on light. Water absorbs light in ways that air does not, due to this color absorption underwater, underwater photography requires a means of compensation to restore the colors and contrast loss from absorption. Water absorbs different wavelengths of light to different degrees. The longest wavelengths with the lowest energy are absorbed first. For example, red is the first to be absorbed, followed by orange and yellow (i.e., the colors disappear underwater in the same order as they appear in the color spectrum), and at depths greater than 36 meters (120 ft) the only visible color is hues of blue. In various embodiments of the present invention, image program 200 utilizes a depth measurement as an input value to reconstruct colors of an object.

Figure 3A:
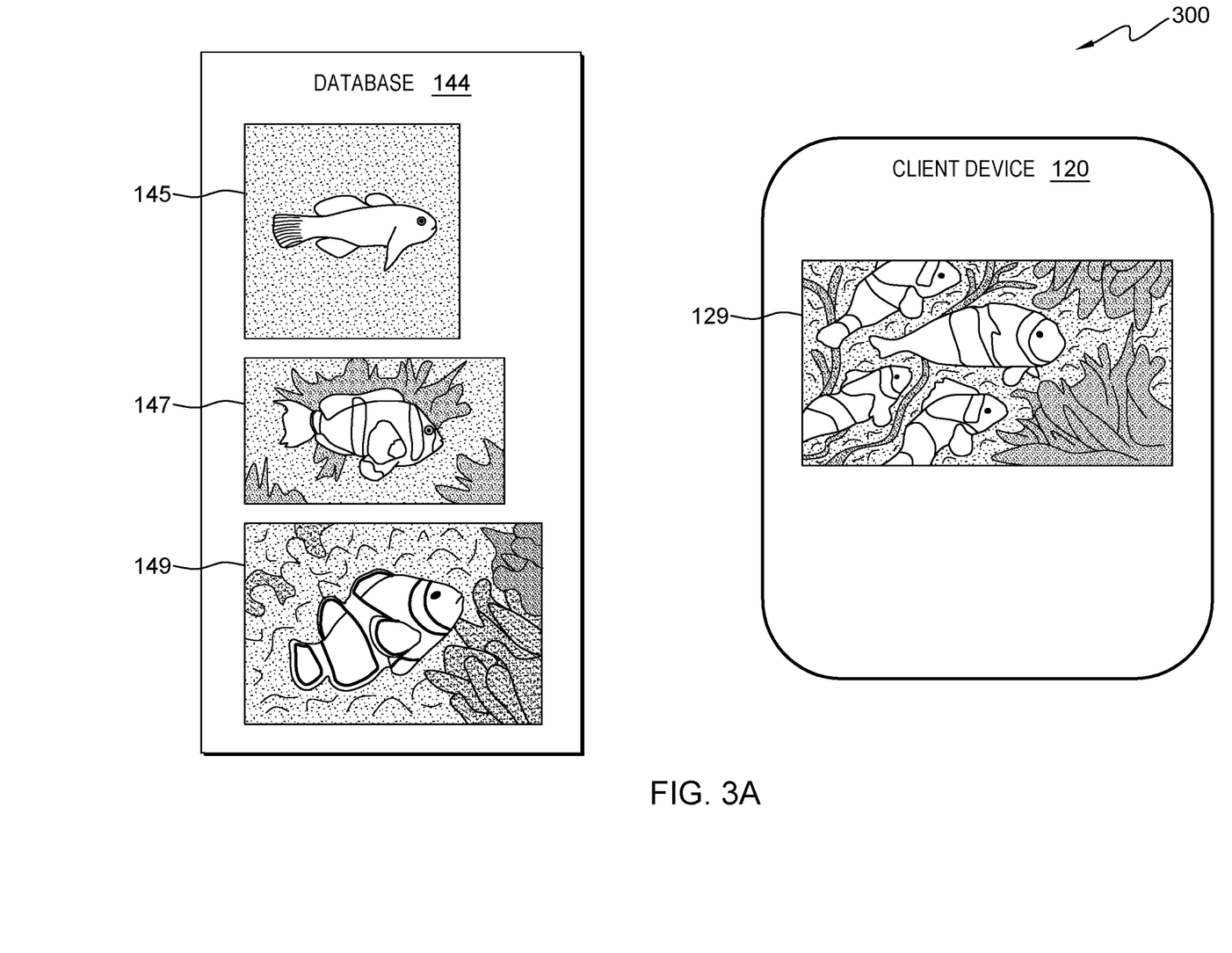
FIG. 3A is an example depiction of components of distributed data environment 100 that include library reference images and a captured underwater image.

FIG. 3A depicts environment 300, which is an example of components of distributed data environment 100 that include library reference images and a captured underwater image. Environment 300 includes database 144, reference image 145, reference image 147, reference image 149, client device 120, and underwater image 129. Reference image 145 is a depiction of a coral reef and a clown goby. Reference image 147 is a depiction of a coral reef and a yellowtail clownfish. Reference image 149 is a depiction of a coral reef and a clownfish. Underwater image 129 is a depiction of an underwater photo that is absent of color due to underwater color absorption. In this example embodiment, reference image 145, reference image 147, and reference image 149 are a part of a collection of images of database 144. Additionally, underwater image 129 is an image captured by client device 120.

In step 206, image program 200 identifies a shape of the image. In various embodiments of the present invention, image program 200 utilizes various computer vision techniques to identify objects (e.g., shapes) of an image of client device 120. In one embodiment, image program 200 identifies an object of an image of client device 120. For example, image program 200 uses object detection techniques (e.g., Viola-Jones, scale-invariant feature transform, histogram of oriented gradients, etc.) to detect one or more shapes (e.g., objects) of an image a digital camera (e.g., client device 120) captures. In this example, image program 200 utilizes a trained machine learning model, which may be trained using labeled images of a database (e.g., database 144) and a support vector machine (SVM), to detect the one or more shapes of the image of the digital camera. In another example, image program 200 may utilize a deep learning approach (e.g., regional convolutional neural network, single shot multibox detector, single-shot refinement neural network for object detection, etc.) to identify one or more shapes of an image of a digital camera.

Figure 3B:
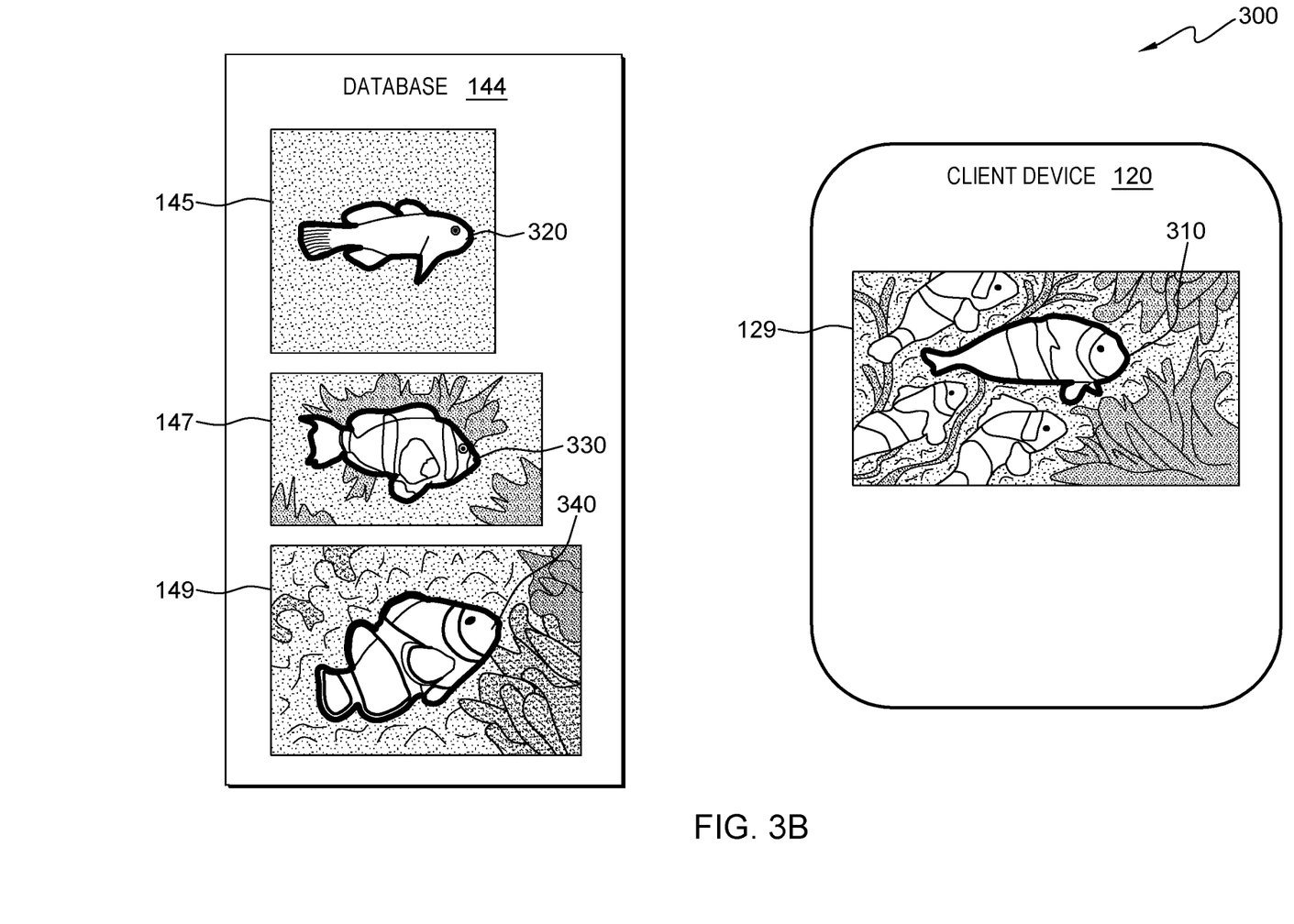
FIG. 3B is an example depiction of images of components of FIG. 3A after image program 200 has identified an object the library reference images and the captured underwater image.

FIG. 3B depicts an example of images of components of FIG. 3A after image program 200 has identified an object the library reference images and the captured underwater image. Environment 300 includes shape 320, shape 330, shape 340, and shape 310, hereinafter shape(s). Shape(s) is a depiction of an object image program 200 has identified respectively in reference image 145, reference image 147, reference image 149, and underwater image 129. In an example embodiment, image program 200 utilizes an object detection technique (e.g., Viola-Jones object detection framework based on Haar Features) to detect shape 310 in image 129. In this example, image program 200 identifies shape 320, shape 330, and shape 340 based using shape 310 as an input of image recognition engine 220.

In decision step 208, image program 200 determines whether the shape is present in a library. In one embodiment, image program 200 utilizes image recognition engine 220 to identify one or more images of database 144 that include an object that matches an object of an image of client device 120. For example, image program 200 uses a library of reference images of a database (e.g., database 144) to create a set of training data to detect a shape (e.g., an object) of an image of a digital camera (e.g., client device 120) in the library of the database. Also, the library of reference images includes photos taken by experienced underwater photographers using high quality underwater lighting. Additionally, the training data includes one or more labels to each image of the library in order for image recognition engine 220 to identify labeled objects that match the shape of the image of the digital camera. In this example, image recognition engine 220 analyzes the image of the digital camera and provides a probability score on a scale of zero (0) to one (1), where one (1) indicates a high probability that the shape of the image of the digital camera matches a labeled object of one or more images of the library.

If image program 200 determines that an object of an image of client device 120 does not match one or more images of database 144 (decision step 208, "NO" branch), then image program 200 provides feedback to image recognition engine 220 to improve an image recognition algorithm of image recognition engine 220. For example, image program 200 determines that image recognition engine 220 does not provide an image of a library of a database with a score greater than a defined threshold value of (0.8) (i.e., no images of the library match a shape of an image of a digital camera), then image program 200 extracts the image and depth measurements to retrain image recognition engine 220 (as in step 214).

If image program 200 determines that an object of an image of client device 120 matches one or more images of database 144 (decision step 208, "YES" branch), then image program 200 modifies a color of the identified one or more images of database 144 that match the object of the image of client device 120. In various embodiments of the present invention image program 200 can modify an entire library image or a matching object of the library image. For example, image program 200 determines that image recognition engine 220 provided an image of a library of a database with a score greater than a defined threshold value of (0.8), then image program 200 uses a depth measurement of a digital camera when capturing an image of the digital camera and corresponding water color absorption information to modify the color of the image of the library.

In an example embodiment, image program 200 utilizes probability scores of image recognition engine 220 to determine whether shape 310 matches an object of an image of database 144. In this example, image recognition engine 220 analyzes features of shape 310 and returns a set of classifiers and scores based on one or more labeled objects of reference image 145, reference image 147, and reference image 149. Image recognition engine 220 returns a classification of fish and a name of clown for shape 310 and identifies reference image 145, reference image 147, and reference image 149 in database 144 due to matching labels. Additionally, image recognition engine 220 compares shape 320, shape 330, and shape 340 to shape 310 to determine a probability (e.g., score) of a match. In this example, image recognition engine 220 provided a score of (0.5) for shape 320 due to shape 320 not having stripes and shape 310 having a different structure. In addition, image recognition engine 220 provided a score of (0.85) for shape 330 due to shape 310 having a similar structure to shape 310 and shape 320 having stripes. As well, image recognition engine 220 provided a score of (0.9) for shape 340 due to shape 310 having a similar structure to shape 310 and shape 340 having similarly shaped stripes. As a result, image program 200 utilizes a defined threshold score (e.g., 0.8) to determine that shape 310 matches shape 330 of reference image 147 and shape 340 of reference image 149 based on the score of shape 330 and shape 340 being greater than the defined threshold score.

In step 210, image program 200 modifies a color of an object of a library image. In one embodiment, image program 200 modifies a color of an object of an image of database 144 that matches an object of an image of client device 120. For example, image program 200 uses measured depth information and an underwater color absorption spectrum histogram to reduce colors of an object of library image. In this example, image program 200 identifies a depth in meters (e.g., 25 meters) that a shape (e.g., an object) of an image of a digital camera (e.g., client device 120) is captured and reduces colors of the object of library image to correspond to color and contrast based on the underwater color absorption spectrum histogram. In an alternative example, image program 200 can automatically reduce colors of a library image based on an underwater color absorption spectrum histogram and cache the library image to improve performance and reduce the utilization of processing resources.

In an example embodiment, image program 200 utilizes depth measurement data of client device 120 when capturing underwater image 129 and color absorption spectrum histogram to modify colors of reference image 145, reference image 147, and reference image 149 to reflect colors similar to underwater image 129 at an equivalent depth underwater. In this example, image program 200 identifies that underwater image 129 was captured at 25 meters below the surface of a body of water. Image program 200 can adjust the color temperatures of reference image 145, reference image 147, and reference image 149 to correspond to a visible spectrum of colors at 25 meters depth based on the color absorption spectrum histogram.

In decision step 212, image program 200 determines whether the shape and color of the object of the library image is a match with the shape of the image. In one embodiment, image program 200 utilizes image recognition engine 220 to determine whether a modified object of an image of database 144 matches an object of an image of client device 120. For example, image program 200 uses image recognition engine 220 to compare local features of a region of an object of a library image of a database (e.g., database 144) and local features of a region of a shape (e.g., an object) of an image of a digital camera (e.g., client device 120) to determine whether the modified colors and shape of the object of the library image match the colors and the shape of the image of the digital camera. In an alternative example, image program 200 provides a match to a user that reviews (e.g., accepts, rejects, etc.) the match of shape and colors of an object of a library image and an image of a digital camera (e.g., client device 120).

If image program 200 determines that a modified object of an image of database 144 does not match an object of an image of client device 120 (decision step 212, "NO" branch), then image program 200 provides feedback to image recognition engine 220 to improve an image recognition algorithm of image recognition engine 220. For example, image program 200 determines that image recognition engine 220 provided an image of a library of a database (e.g., database 144) with a score greater than a defined threshold value of (0.8), but the reduced colors do not match colors of a shape of an image of a digital camera (e.g., client device 120), then image program 200 uses the image of the library used as machine learning training data (e.g., object, depth measurement, color information, etc.) to improve an image recognition algorithm (i.e., image recognition engine 220) and searches the library that includes recolored images with an object that matches the shape of the digital camera.

In an example embodiment, image program 200 utilizes probability scores of image recognition engine 220 to identify a closest proximate shape and color match with shape 310 of underwater image 129. In this example embodiment, of image recognition engine 220 compares color information of local features of shape 330 and shape 340 to shape 310 to determine a probability (e.g., score) of a match. In this example, image recognition engine 220 provided a score of (0.8) for shape 330 due to shape 310 having a similar structure to shape 310 and shape 320 having a variation in color degradation and stripe shape from shape 310. In addition, image recognition engine 220 provided a score of (0.9) for shape 340 due to shape 310 having a similar structure to shape 310 and shape 340 having similar shaped stripes and color degradation as shape 310.

As a result, image program 200 compares scores provided by image recognition engine to determine that shape 340 is a better proximate match to shape 310 than shape 330 due to the score (e.g., 0.9) of shape 340 being greater in value than the score (0.8) of shape 330. In an alternative example embodiment, image program 200 provides shape 340 (i.e., the better proximate match to shape 310) to a user that reviews (e.g., accepts, rejects, etc.) the match of shape and colors of shape 340 and shape 310.

If image program 200 determines that a modified object of an image of database 144 matches an object of an image of client device 120 (decision step 212, "YES" branch), then image program 200 utilizes original data (e.g., lighting data, color data, etc.) of the modified object of the image of the database to reconstruct colors of the object of the image of client device 120. For example, image program 200 determines that image recognition engine 220 provided an image of a library of a database (e.g., database 144) with a score greater than a defined threshold value of (0.8) and the reduced colors match colors of a shape of an image of a digital camera (e.g., client device 120), then image program 200 uses the color information of the original image of the library to generate colors for corresponding features of the shape of the image of the digital camera.

In step 214, image program 200 retrains an image recognition algorithm. In one embodiment, image program 200 utilizes feedback data to retrain image recognition engine 220 to identify one or more images of database 144 that include an object and colors that match an object of an image of client device 120. For example, image program 200 uses depth measurements and color information of rejected matches to create a set of training data to detect a shape (e.g., an object) of an image of a digital camera (e.g., client device 120) in the library of the database. Additionally, the training data includes one or more labels to each image of the library in order for image recognition engine 220 to identify labeled objects and recolored library images that match the shape of the image of the digital camera.

In step 216, image program 200 reconstructs the color of the shape. In one embodiment, image program 200 generates colors for one or more shapes of an image of client device 120. For example, image program 200 uses a color corresponding to matching local features of a region of an object of a library image of a database (e.g., database 144) and local features of a region of a shape (e.g., an object) of an image of a digital camera (e.g., client device 120) to reconstruct the colors of the shape of the image of the digital camera that are absent due to color absorption. In this example, image program 200 generates matches and colors for one or more shapes of the image of the digital camera independently by repeating the steps of image program 200 until the color of the one or more shapes of the image of the digital camera are reconstructed.

In another embodiment, image program 200 utilizes one or more images of database 144 to modify an image of client device 120. For example, image program 200 uses one or more images of a library of a database (e.g., database 144) to reconstruct an image of a digital camera (e.g., client device 120), which has reduced or absent color information. In this example, image program 200 utilizes color information (e.g., original color information) of an object of an image of the library of the database determined to match a shape of the image of the digital camera to generate colors for the shape of the image of the digital camera. Additionally, image program 200 performs one or more iterations of steps of image program 200 reconstructing the colors of each identified shape of the image of the digital camera. As a result, image program 200 eliminates the effect of color absorption due to the depth at which the image of the digital camera was captured.

Figure 4:
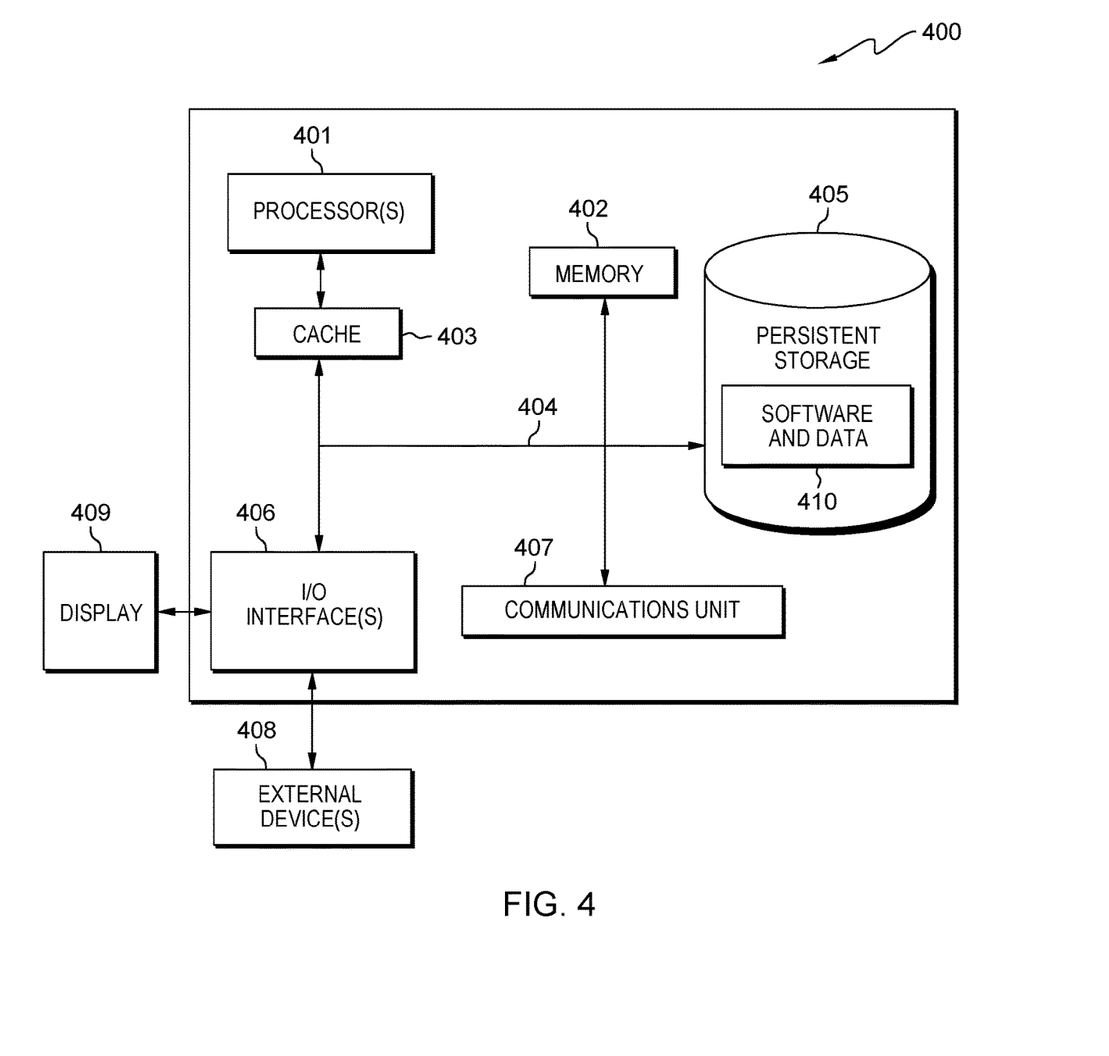
FIG. 4 is a block diagram of components of the client device and server of FIG. 1, in accordance with an embodiment of the present invention.

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122, application 124, and sensor 126. With respect to server 140, software and data 410 includes data of storage device 142, database 144, image program 200, and image recognition engine 220.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   obtaining, by one or more processors, image data from a computing device that includes an underwater image;
   determining, by one or more processors, a depth measurement corresponding to a depth at which the underwater image was taken;
   identifying, by one or more processors, an object of the underwater image based at least in part on a shape of the object;
   utilizing, by one or more processors, one or more colors of a shape of an object of a reference image, wherein the shape of the object of the reference image corresponds to the shape of the object of the underwater image;
   generating, by one or more processors, color information for the shape of the underwater image based on the extracted one or more colors of the shape of the object of the reference image
   reconstructing, by one or more processors, colors of the object of the underwater image based at least in part on the color information extracted from the shape of the object of the reference image.

2. The method of claim 1, further comprising:
   identifying, by one or more processors, one or more reference images based at least in part on a classification of the object of the underwater image; and
   determining, by one or more processors, whether the shape of the object of the underwater image is included in the one or more reference images.

3. The method of claim 1, further comprising:
   modifying, by one or more processors, one or more colors of the reference image based at least in part on the depth measurement corresponding to the underwater image;
   comparing, by one or more processors, the shape and colors of the object of the underwater image and a reference shape and the modified one or more colors of the reference image; and
   determining, by one or more processors, whether the shape and colors of the object of the underwater image and the reference shape and modified one or more colors of the reference image match, above a defined threshold condition.

4. The method of claim 3, further comprising:
in response to determining that the match of the shape and colors of the object of the underwater image and the reference shape and modified one or more colors of the reference image is below the defined threshold condition, extracting, by one or more processors, data of the match, wherein the data includes objects, shapes, color information, and depth measurements of the underwater image and the reference image;
creating, by one or more processors, a set of training data using the data of the match; and
retraining, by one or more processors, an image recognition algorithm using the set of training data.

5. The method of claim 1, wherein identifying the object of the underwater image based at least in part on the shape of the object, further comprises:
detecting, by one or more processors, the object of the underwater image;
identifying, by one or more processors, the shape of the object of the underwater image, wherein the shape includes an outline of an area of the object in the underwater image;
identifying, by one or more processors, one or more features of the outline of the area of the object in the underwater image;
identifying, by one or more processors, a structure of the object of the underwater image, wherein the structure includes the shape and the one or more features of the object; and
comparing, by one or more processors, the structure of the object of the underwater image to a reference object of the reference image.

6. The method of claim 1, wherein determining the depth measurement corresponding to the underwater image, further comprises:
identifying, by one or more processors, metadata of the underwater image in the image data of the computing device; and
identifying, by one or more processors, a depth reading of the computing device indicated in the metadata of the underwater image.

7. A computer program product comprising:
one or more computer readable storage media and program instructions stored on the one or more computer readable storage media, the program instructions comprising:
program instructions to obtain image data from a computing device that includes an underwater image;
program instructions to determine a depth measurement corresponding to a depth at which the underwater image was taken;
program instructions to identify an object of the underwater image based at least in part on a shape of the object;
program instructions to utilize one or more colors of a shape of an object of a reference image, wherein the shape of the object of the reference image corresponds to the shape of the object of the underwater image;
program instructions to generate color information for the shape of the underwater image based on the extracted one or more colors of the shape of the object of the reference image;
program instructions to reconstruct colors of the object of the underwater image based at least in part on the color information extracted from the shape of the object of the reference image.

8. The computer program product of claim 7, further comprising program instructions, stored on the one or more computer readable storage media, to:
identify one or more reference images based at least in part on a classification of the object of the underwater image; and
determine whether the shape of the object of the underwater image is included in the one or more reference images.

9. The computer program product of claim 7, further comprising program instructions, stored on the one or more computer readable storage media, to:
modify one or more colors of the reference image based at least in part on the depth measurement corresponding to the underwater image;
compare the shape and colors of the object of the underwater image and a reference shape and the modified one or more colors of the reference image; and
determine whether the shape and colors of the object of the underwater image and the reference shape and modified one or more colors of the reference image match, above a defined threshold condition.

10. The computer program product of claim 9, further comprising program instructions, stored on the one or more computer readable storage media, to:
in response to determining that the match of the shape and colors of the object of the underwater image and the reference shape and modified one or more colors of the reference image is below the defined threshold condition, extract data of the match, wherein the data includes objects, shapes, color information, and depth measurements of the underwater image and the reference image;
create a set of training data using the data of the match; and
retrain an image recognition algorithm using the set of training data.

11. The computer program product of claim 7, wherein program instructions to identify the object of the underwater image based at least in part on the shape of the object, further comprise program instructions to:
detect the object of the underwater image;
identify the shape of the object of the underwater image, wherein the shape includes an outline of an area of the object in the underwater image;
identify one or more features of the outline of the area of the object in the underwater image;
identify a structure of the object of the underwater image, wherein the structure includes the shape and the one or more features of the object; and
compare the structure of the object of the underwater image to a reference object of the reference image.

12. The computer program product of claim 7, wherein program instructions to determine the depth measurement corresponding to the underwater image, further comprise program instructions to:
identify metadata of the underwater image in the image data of the computing device; and
identify a depth reading of the computing device indicated in the metadata of the underwater image.

13. A computer system comprising:
one or more computer processors;
one or more computer readable storage media; and program instructions stored on the computer readable storage media for execution by at least one of the one or more processors, the program instructions comprising:

program instructions to obtain image data from a computing device that includes an underwater image;

program instructions to determine a depth measurement corresponding to a depth at which the underwater image was taken;

program instructions to identify an object of the underwater image based at least in part on a shape of the object;

program instructions to utilize one or more colors of a shape of an object of a reference image, wherein the shape of the object of the reference image corresponds to the shape of the object of the underwater image;

program instructions to generate color information for the shape of the underwater image based on the extracted one or more colors of the shape of the object of the reference image;

program instructions to reconstruct colors of the object of the underwater image based at least in part on the color information extracted from the shape of the object of the reference image.

14. The computer system of claim 13, further comprising program instructions, stored on the one or more computer readable storage media for execution by at least one of the one or more processors, to:

identify one or more reference images based at least in part on a classification of the object of the underwater image; and determine whether the shape of the object of the underwater image is included in the one or more reference images.

15. The computer system of claim 13, further comprising program instructions, stored on the one or more computer readable storage media for execution by at least one of the one or more processors, to:

modify one or more colors of the reference image based at least in part on the depth measurement corresponding to the underwater image;

compare the shape and colors of the object of the underwater image and a reference shape and the modified one or more colors of the reference image; and determine whether the shape and colors of the object of the underwater image and the reference shape and modified one or more colors of the reference image match, above a defined threshold condition.

16. The computer system of claim 15, further comprising program instructions, stored on the one or more computer readable storage media for execution by at least one of the one or more processors, to:

in response to determining that the match of the shape and colors of the object of the underwater image and the reference shape and modified one or more colors of the reference image is below the defined threshold condition, extract data of the match, wherein the data includes objects, shapes, color information, and depth measurements of the underwater image and the reference image;

create a set of training data using the data of the match; and retrain an image recognition algorithm using the set of training data.

17. The computer system of claim 13, wherein program instructions to identify the object of the underwater image based at least in part on the shape of the object, further comprise program instructions to:

detect the object of the underwater image;

identify the shape of the object of the underwater image, wherein the shape includes an outline of an area of the object in the underwater image;

identify one or more features of the outline of the area of the object in the underwater image;

identify a structure of the object of the underwater image, wherein the structure includes the shape and the one or more features of the object; and compare the structure of the object of the underwater image to a reference object of the reference image.

* * * * *